United States Patent

Okamoto et al.

(10) Patent No.: US 12,026,189 B2
(45) Date of Patent: Jul. 2, 2024

(54) RANKING EXPLANATORY VARIABLES IN MULTIVARIATE ANALYSIS

(71) Applicant: International Business Machines Corporation, Armonk, NY (US)

(72) Inventors: Kosuke Okamoto, Tokyo (JP); Yoshinori Tahara, Yamato (JP); Tohru Hasegawa, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 221 days.

(21) Appl. No.: 17/650,534

(22) Filed: Feb. 10, 2022

(65) Prior Publication Data

US 2023/0252067 A1    Aug. 10, 2023

(51) Int. Cl.
*G06F 16/00* (2019.01)
*G06F 16/33* (2019.01)
(Continued)

(52) U.S. Cl.
CPC ........ *G06F 16/383* (2019.01); *G06F 16/3334* (2019.01); *G06F 16/3346* (2019.01); *G06F 16/35* (2019.01)

(58) Field of Classification Search
CPC ............... G06F 16/383; G06F 16/3334; G06F 16/3346; G06F 16/35
See application file for complete search history.

(56) References Cited

U.S. PATENT DOCUMENTS

2007/0214140 A1* 9/2007 Dom ...................... G06F 16/353
2013/0159300 A1* 6/2013 Gallivan ............... G06F 16/955
707/730

(Continued)

FOREIGN PATENT DOCUMENTS

JP    2004355174 A    12/2004
JP    2021033326 A    3/2021

OTHER PUBLICATIONS

"Selection Process for Multiple Regression", Statistics Solutions, accessed on Dec. 9, 2021, 7 pages, <https://www.statisticssolutions.com/free-resources/directory-of-statistical-analyses/selection-process-for-multiple-regression/>.

(Continued)

*Primary Examiner* — Syed H Hasan
(74) *Attorney, Agent, or Firm* — Edward P. Li

(57) ABSTRACT

A computer-implemented method, a computer program product, and a computer system for ranking explanatory variables in multivariate analysis. A computer system extracts words from documents related to categories, creates a histogram of the words in each category, and selects top words in each histogram, where the top words are used as representing words in each category. A computer system generates respective feature vectors of explanatory variable candidates and a feature vector of an objective variable, where a feature vector of a corresponding variable includes elements corresponding to respective ones of the categories and a value of element indicates whether a name of the corresponding variable is included in the top words. A computer system calculates cosine similarity between each of the respective feature vectors of the explanatory variable candidates and the feature vector of the objective variable. A computer system ranks the explanatory variable candidates, based on the cosine similarity.

14 Claims, 4 Drawing Sheets

(51) Int. Cl.
    *G06F 16/35*     (2019.01)
    *G06F 16/383*     (2019.01)

(56) References Cited

U.S. PATENT DOCUMENTS

| | | | |
|---|---|---|---|
| 2014/0012855 A1* | 1/2014 | Firat | G06F 16/35 |
| | | | 707/740 |
| 2016/0196505 A1* | 7/2016 | Katsuki | G06N 7/01 |
| | | | 706/12 |
| 2018/0246958 A1* | 8/2018 | Serita | G06F 16/00 |
| 2020/0394528 A1 | 12/2020 | Makino | |
| 2021/0133277 A1 | 5/2021 | Takano | |

OTHER PUBLICATIONS

Mell et al., "The NIST Definition of Cloud Computing", NIST National Institute of Standards and Technology U.S. Department of Commerce, Special Publication 800-145, Sep. 2011, 7 pages.
Park et al., "Subset Selection for Multiple Linear Regression via Optimization", arXiv:1701.07920v2 [stat.ML] Jan. 13, 2020, 26 pages.

\* cited by examiner

RANKING EXPLANATORY VARIABLES IN MULTIVARIATE ANALYSIS

BACKGROUND

The present invention relates generally to multivariate analysis, and more particularly to ranking explanatory variables in multivariate analysis.

In recent years, more data have become open to the public as open data. The data is analyzed for use in business improvement. In such analysis, the data is usually prepared as a table, and columns associated with an objective variable represented by an objective column are used as explanatory variables. When multivariate analysis is conducted using a large amount of data, explanatory variables suitable for an objective variable need to be found out. When there are not many candidates of explanatory variables, humans can examine details and select explanatory variables. However, when there are many candidates, selection by humans is not realistic.

A stepwise method for mechanical selection of explanatory variables has been used. However, the stepwise method has problems as follows. (1) Since the meaning of a variables is not taken into consideration, if there is data that seems to have a correlation in the prepared data, it will be used as an explanatory variable. (2) If there are a large number of candidates, the amount of calculation will be large and the time to select the explanatory variables will be long.

SUMMARY

In one aspect, a computer-implemented method for ranking explanatory variables in multivariate analysis is provided. The method includes extracting words from documents related to categories. The method further includes creating a histogram of the words in each category. The method further includes selecting top words in each histogram, where the top words are used as representing words in each category. The method further includes generating respective feature vectors of explanatory variable candidates and a feature vector of an objective variable, where a feature vector of a corresponding variable includes elements corresponding to respective ones of the categories, where a value of an element indicates whether a name of the corresponding variable is included in the top words. The method further includes calculating cosine similarity between each of the respective feature vectors of the explanatory variable candidates and the feature vector of the objective variable. The method further includes ranking the explanatory variable candidates, based on the cosine similarity.

In another aspect, a computer program product for ranking explanatory variables in multivariate analysis is provided. The computer program product comprises a computer readable storage medium having program instructions embodied therewith, and the program instructions are executable by one or more processors. The program instructions are executable to: extract words from documents related to categories; create a histogram of the words in each category; select top words in each histogram, where the top words are used as representing words in each category; generate respective feature vectors of explanatory variable candidates and a feature vector of an objective variable, where a feature vector of a corresponding variable includes elements corresponding to respective ones of the categories, where a value of an element indicates whether a name of the corresponding variable is included in the top words; calculate cosine similarity between each of the respective feature vectors of the explanatory variable candidates and the feature vector of the objective variable; and rank the explanatory variable candidates, based on the cosine similarity.

In yet another aspect, a computer system for ranking explanatory variables in multivariate analysis is provided. The computer system comprises one or more processors, one or more computer readable tangible storage devices, and program instructions stored on at least one of the one or more computer readable tangible storage devices for execution by at least one of the one or more processors. The program instructions are executable to extract words from documents related to categories. The program instructions are further executable to create a histogram of the words in each category. The program instructions are further executable to select top words in each histogram, where the top words are used as representing words in each category. The program instructions are further executable to generate respective feature vectors of explanatory variable candidates and a feature vector of an objective variable; a feature vector of a corresponding variable includes elements corresponding to respective ones of the categories, and a value of an element indicates whether a name of the corresponding variable is included in the top words. The program instructions are further executable to calculate cosine similarity between each of the respective feature vectors of the explanatory variable candidates and the feature vector of the objective variable. The program instructions are further executable to rank the explanatory variable candidates, based on the cosine similarity.

DETAILED DESCRIPTION

In a data table, an objective variable and explanatory variables are semantically classified according to their column names. In embodiment of the present invention, the classifications are used to lower priority of any explanatory variables unsuitable for analysis, and the classifications create a list of explanatory variables sorted in order of decreasing their relevance to an objective variable. This list is used to narrow down explanatory variables by an existing technique such as a stepwise method. When there are too many explanatory variable candidates included in the list, top N explanatory variables are selected and then the stepwise method is applied.

Figure 1:
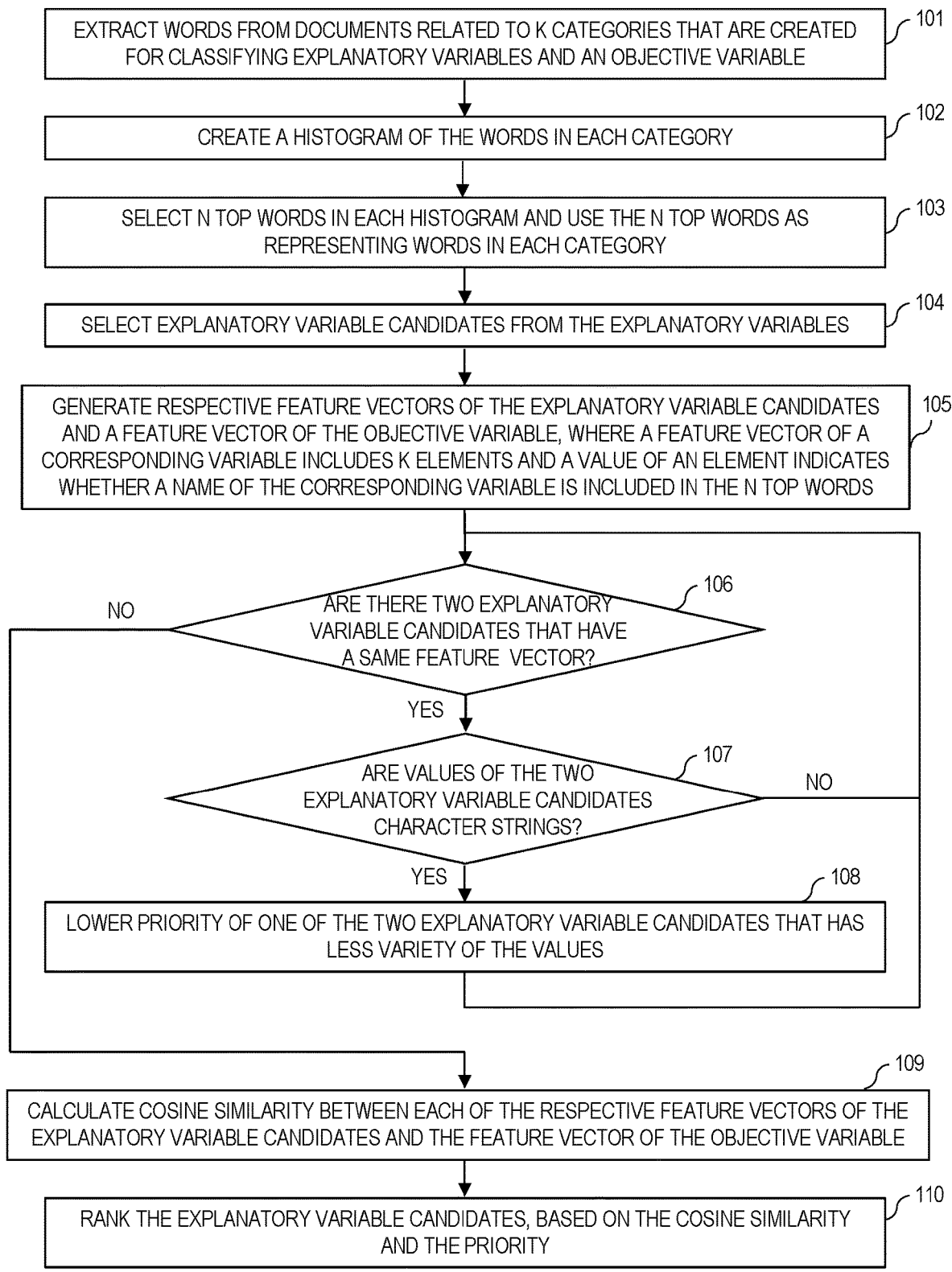
FIG. 1 is a flowchart showing operational steps of ranking explanatory variables in multivariate analysis, in accordance with one embodiment of the present invention.

FIG. 1 is a flowchart showing operational steps of ranking explanatory variables in multivariate analysis, in accordance with one embodiment of the present invention. The operational steps are implemented on one or more computing devices or servers. A computing device or server is described in more detail in later paragraphs with reference to FIG. 3. The operational steps may be implemented in a cloud computing environment. The cloud computing environment is described in more detail in later paragraphs with reference to FIG. 4 and FIG. 5.

At step 101, the one or more computing devices or servers extract words from documents related to k categories that are created for classifying explanatory variables and an objective variable. First, categories $C_1, \ldots, C_k$ are prepared for classifying column names of the explanatory variables and the objective variable. For example, the categories may include geographical information, medical information, weather information, and financial information, etc. For example, papers and website documents which are included in categories $C_1, \ldots, C_k$ are collected, and then the one or more computing devices or servers extract words from the papers and website documents. In extracting the words, stopwords (frequently appearing words such as postpositional particles and articles) are excluded.

At step 102, the one or more computing devices or servers create a histogram of the words in each category. The one or more computing devices or servers create k histograms for respective ones of categories $C_1, \ldots, C_k$.

At step 103, the one or more computing devices or servers select N top words in each histogram and use the N top words as representing words in each category. N is a predetermined number; for example, N is pre-set as 30. The one or more computing devices or servers obtain k groups of N top words, each group corresponding to one category.

At step 104, the one or more computing devices or servers select explanatory variable candidates from the explanatory variables. The priorities of explanatory variables (column names) are considered, and an optimized set of explanatory variables are selected by mechanical selection, such as a stepwise method. Selecting explanatory variable candidates from the explanatory variables can reduce calculation time. Furthermore, through selecting explanatory variable candidates from the explanatory variables, more important explanatory variables can be evaluated and unimportant explanatory variables can be eliminated in following steps.

At step 105, the one or more computing devices or servers generate respective feature vectors of the explanatory variable candidates and a feature vector of the objective variable, where a feature vector of a corresponding variable includes k elements and a value of an element indicates whether a name of the corresponding variable is included in the N top words. For example, when a column name is included in the N top words representing a category $C_i$, an i-th element of a k-dimensional vector is set to 1; when a column name is not included in the N top words representing a category $C_i$, the i-th element of a k-dimensional vector is set to 0. The generated feature vector is called a vector by category.

In the case where a column name itself is not included in the N top words, similar words of the column name will be treated as the column name in determining the i-th element of the k-dimensional vector. For example, for determining the similar words from a common corpus (e.g., Wikipedia), Word2Vec is used to calculate cosine similarity between a feature vector of a column name and feature vectors of words in the common corpus.

Although the embodiment presented here uses a feature vector by category with each element set to either 0 or 1, weights may be applied to provide a feature vector with elements taking a value other than 0 or 1. For example, words may be numbered in ascending order from 1 to N (1 corresponding to the most top word) in a histogram of N top words, and a reciprocal of each number as a feature vector element, in a case where a column name is included in the N top words.

At step 106, the one or more computing devices or servers determine whether there are two explanatory variable candidates that have a same feature vector. In response to determining that the two explanatory variable candidates have the same feature vector (YES branch of decision step 106), at step 107, the one or more computing devices or servers determine whether values of the two explanatory variable candidates are character strings. In response to determining that values of the two explanatory variable candidates are character strings (YES branch of decision step 107), the one or more computing devices or servers at step 108 lower priority of one of the two explanatory variable candidates that has less variety of the values. In other words, if the two explanatory variable candidates have the same feature vector and the values of the two explanatory variable candidates are character strings, then the priority of one explanatory variable candidate that has less variety of the values will be lowered.

The reason of lowering the priority of the explanatory variable candidate that has less variety of the values is as follows. If an explanatory variable candidate with less variety in the character string is adopted as an explanatory variable, there is not many measures to be taken as an action after analysis of data. In general, when data analysis is used for business improvement, it is more preferable to have a wider range of actions to be taken for improvement.

An example of lowering the priority of the explanatory variable candidate that has less variety of the values is shown in Table 1.

TABLE 1

| Name | Earning | State | City |
| --- | --- | --- | --- |
| City A | 22334455 | State 1 | City A |
| City B | 112233 | State 2 | City B |
| City C | 33344455 | State 3 | City C |
| City D | 1112223 | State 3 | City D |
| City E | 334455 | State 4 | City E |

When "State" and "City" (column names of explanatory variable candidates) have a same feature vector and their values are character strings, priority of "State" is lowered because the explanatory variable candidate with column name "State" has four kinds of values ("State 1", "State 2", "State 3", and "State 4") and the explanatory variable candidate with column name "City" has five kinds of values ("City A", "City B", "City C", "City D" and "City E").

In response to determining that values of the two explanatory variable candidates are not character strings (NO branch of decision step 107), the one or more computing devices or servers will iterate step 106. Also, after step 108, the one or more computing devices or servers will also iterate step 106. During iteration of step 106, the one or more computing devices or servers check other explanatory variable candidates and determine whether any two explanatory variable candidates in other explanatory variable candidates have the same feature vector, until all the explanatory variable candidates are checked and no more explanatory variable candidates have the same feature vector.

If the two explanatory variable candidates do not have the same feature vector (NO branch of decision step 106), it is indicated that all the explanatory variable candidates are checked and no more explanatory variable candidates have the same feature vector. Therefore, the one or more computing devices or servers ends the iteration and will execute step 109. At step 109, the one or more computing devices or servers calculate cosine similarity between each of the respective feature vectors of the explanatory variable candidates and the feature vector of the objective variable. The respective feature vectors of the explanatory variable candidates and the feature vector the objective variable are obtained at step 105.

At step 110, the one or more computing devices or servers rank the explanatory variable candidates, based on the cosine similarity and the priority. The one or more computing devices or servers create a list of the explanatory variable candidates sorted in an order. In the list, a ranking of the explanatory variable candidates is based on an order of the cosine similarity calculated at step 109. In the list, the order starts from an explanatory variable that is most relevant to the objective variable, in a descending order of cosine similarity. A ranking of the explanatory variable candidates having the same feature vector is based on the priority determined at step 108.

The explanatory variable candidates in the list are narrowed down. To narrow down explanatory variables, a stepwise method may be used. A predetermined number of top explanatory variable candidates in the list, which are most relevant to the objective variable, may be selected for the multivariate analysis.

A data table in an example is shown in Table 2.

TABLE 2

| Name   | Earning  | State   | City   | Average Income | Average Age |
|--------|----------|---------|--------|----------------|-------------|
| City A | 22334455 | State 1 | City A | 150000         | 35          |
| City B | 112233   | State 2 | City B | 120000         | 40          |
| City C | 33344455 | State 3 | City C | 170000         | 40          |
| City D | 1112223  | State 3 | City D | 180000         | 30          |
| City E | 334455   | State 4 | City E | 130000         | 45          |

In the example, a column name of an objective variable is "Earning", and column names of explanatory variable candidates are "State", "City", "Average Age", and "Average Income".

Four types of categories, including earning information, store information, geographical information, and household economy are prepared. The objective variable and the explanatory variable candidates are assumed to belong to the categories as follows:
"Earning": {earning information, store information}
"State": {geographical information, store information}
"City": {geographical information, store information}
"Average Income": {household economy}
"Average Age": {store information, household economy}

Feature vectors of the objective variable ("Earning") and the explanatory variable candidates ("State", "City", "Average Age", and "Average Income") are as follows:
"Earning": (1,1,0,0)
"State": (0,1,1,0)
"City": (0,1,1,0)
"Average Income": (0,0,0,1)
"Average Age": (0,1,0,1)

Two explanatory variable candidates "State" and "City" have a same feature vector (0,1,1,0) and their values are character strings. "State" has four kinds of values while "City" has five kinds of values, so that the priority of "State" is lowered.

The cosine similarity between the objective variable ("Earning") and each explanatory variable candidate ("City", "Average Age", and "Average Income") is calculated and obtained as follows:
cos("Earning", "City")=0.5
cos("Earning", "Average Income")=0
cos("Earning", "Average Age")=0.5

Based on the cosine similarity, the explanatory variable candidates are ranked in the following order: "City", "State", "Average Age", and "Average Income". When the explanatory variable candidates are ranked in such an order, a user may examine details and further narrow down the explanatory variable candidates or one or more computing devices or server may use a stepwise method to narrow down the explanatory variable candidates.

Figure 2:
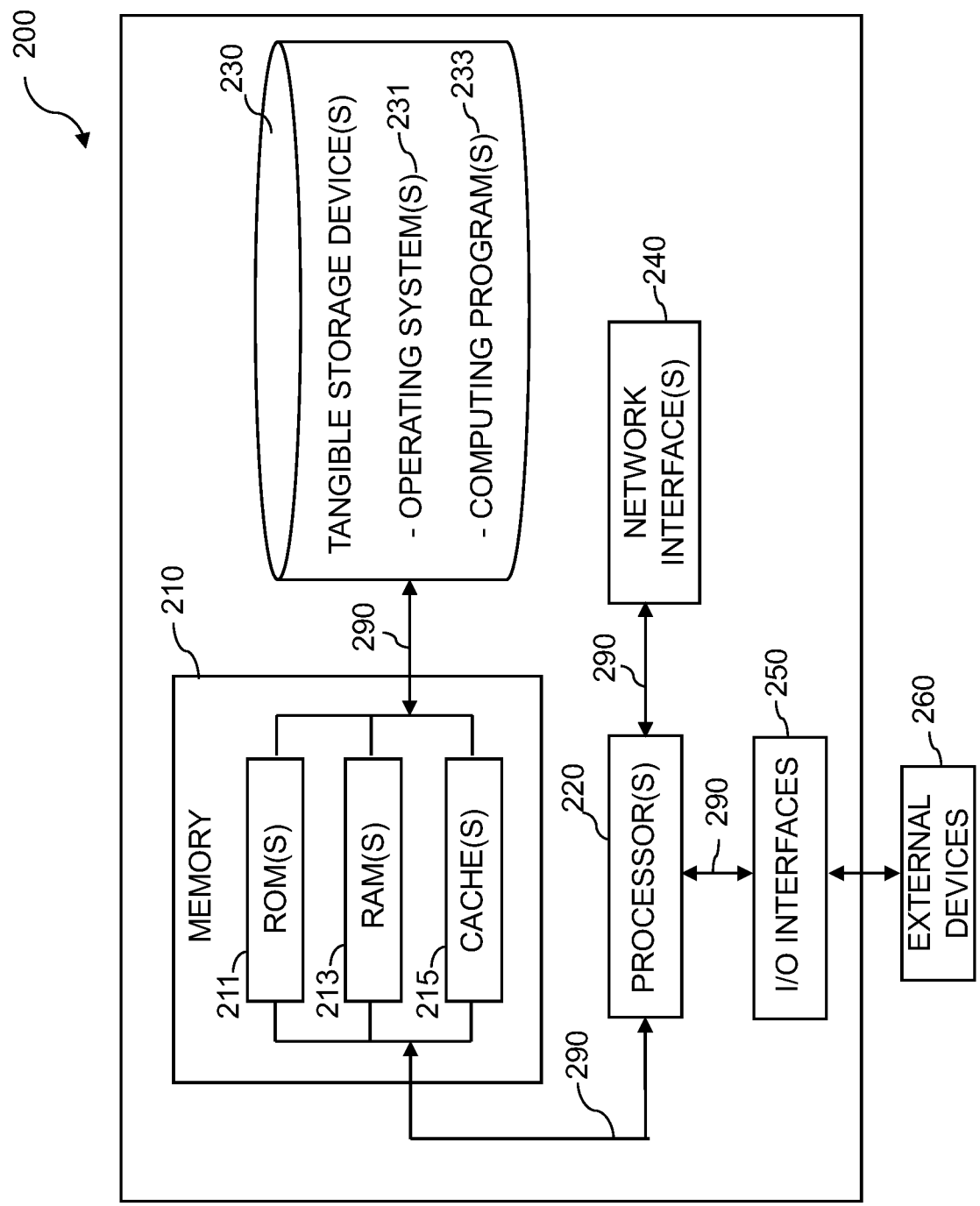
FIG. 2 is a diagram illustrating components of a computing device or server, in accordance with one embodiment of the present invention.

FIG. 2 is a diagram illustrating components of computing device or server 200, in accordance with one embodiment of the present invention. It should be appreciated that FIG. 2 provides only an illustration of one implementation and does not imply any limitations; different embodiments may be implemented.

Referring to FIG. 2, computing device 200 includes processor(s) 220, memory 210, and tangible storage device(s) 230. In FIG. 2, communications among the above-mentioned components of computing device 200 are denoted by numeral 290. Memory 210 includes ROM(s) (Read Only Memory) 211, RAM(s) (Random Access Memory) 213, and cache(s) 215. One or more operating systems 231 and one or more computer programs 233 reside on one or more computer readable tangible storage device(s) 230.

Computing device 200 further includes I/O interface(s) 250. I/O interface(s) 250 allows for input and output of data with external device(s) 260 that may be connected to computing device 200. Computing device 200 further includes network interface(s) 240 for communications between computing device 200 and a computer network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
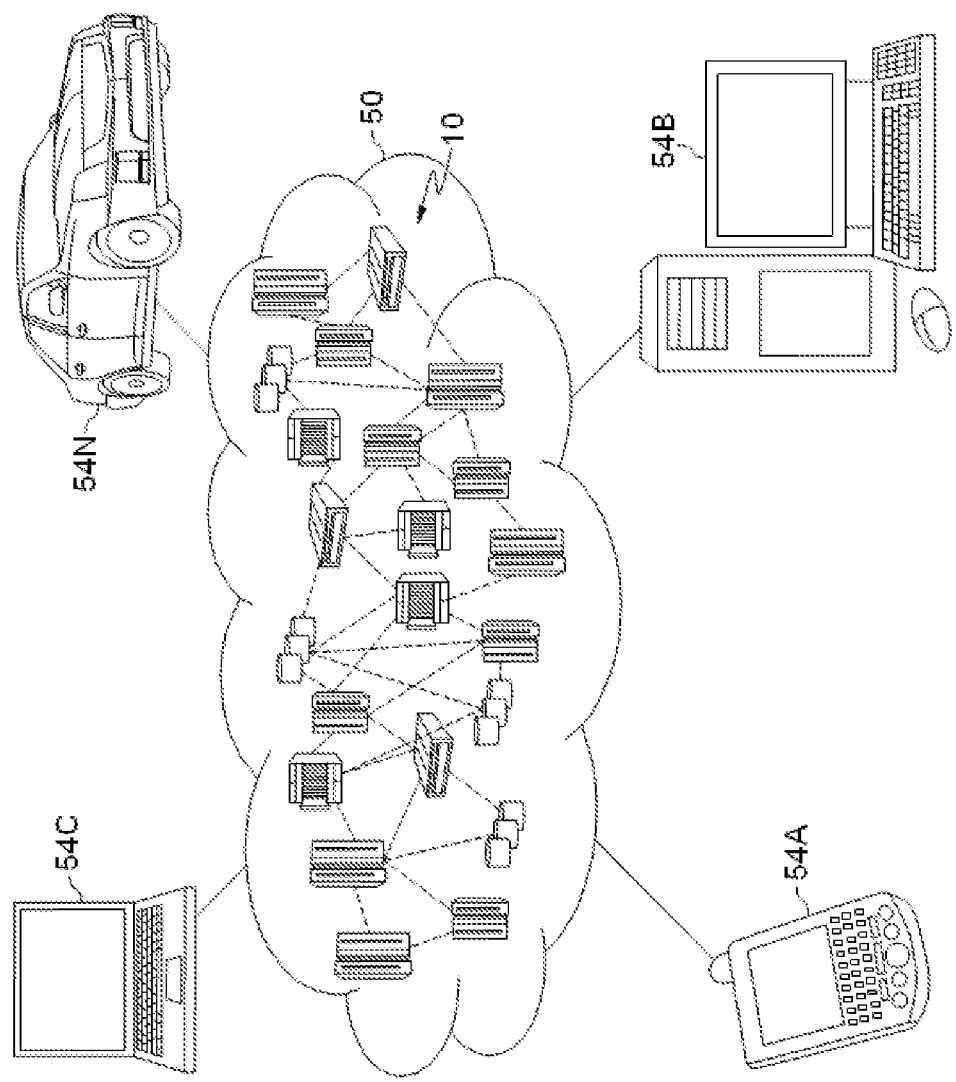
FIG. 3 depicts a cloud computing environment, in accordance with one embodiment of the present invention.

Referring now to FIG. 3, illustrative cloud computing environment 50 is depicted. As shown, cloud computing environment 50 includes one or more cloud computing nodes 10 with which local computing devices are used by cloud consumers, such as mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N are intended to be illustrative only and that computing nodes 10 and cloud computing environment 50 can communicate with any type of computerized device over any type of network and/or network addressable connection (e.g., using a web browser).

Figure 4:
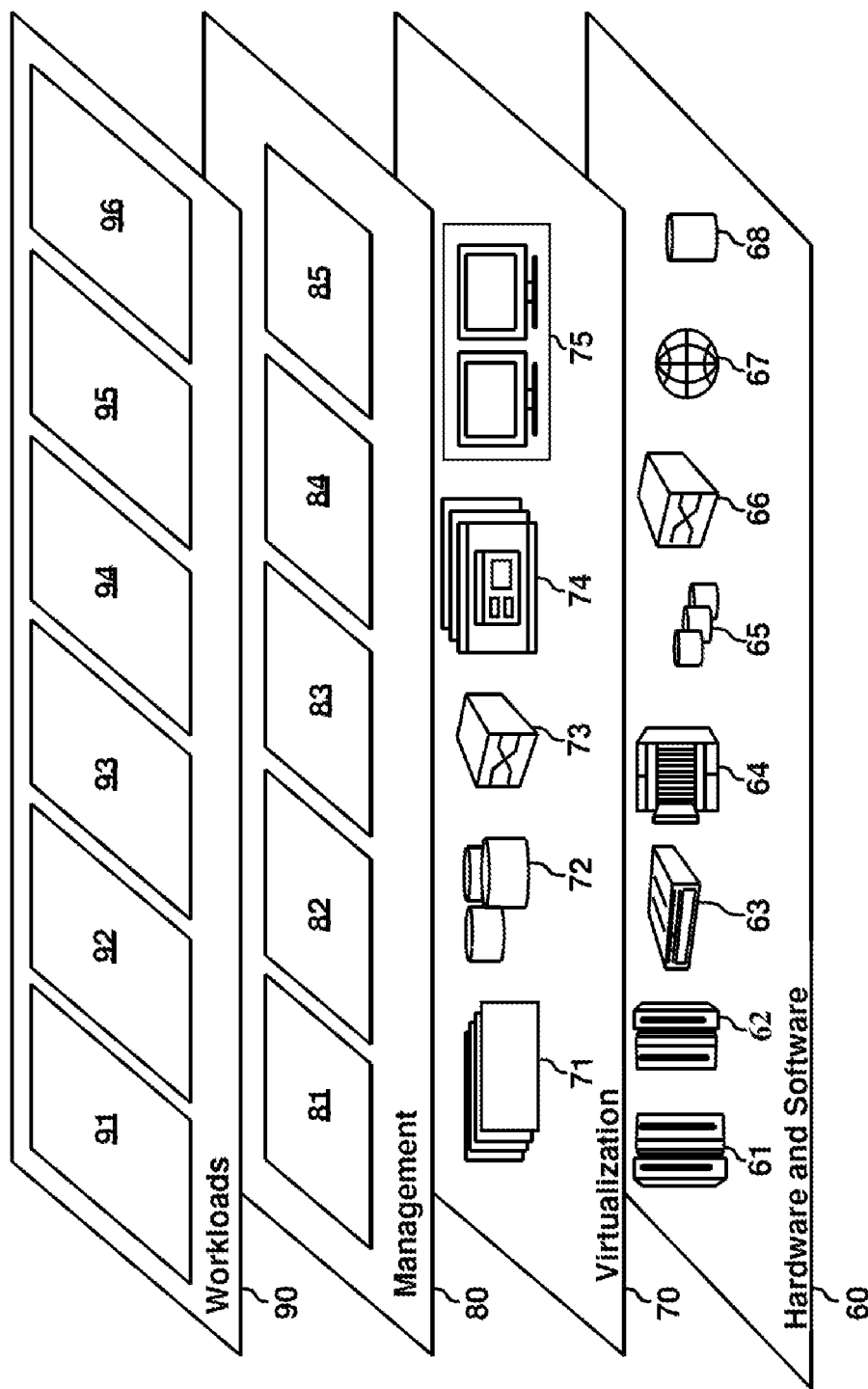
FIG. 4 depicts abstraction model layers in a cloud computing environment, in accordance with one embodiment of the present invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and function 96. Function 96 in the present invention is the functionality of ranking explanatory variables in multivariate analysis.

What is claimed is:

1. A computer-implemented method for ranking explanatory variables in multivariate analysis, the method comprising:
   extracting words from documents related to categories that are created for classifying a set of explanatory variables and an objective variable in the multivariate analysis;
   creating a histogram of the words in each category;
   selecting top words in each histogram, the top words used as representing words in each category;
   selecting a set of explanatory variable candidates from the set of explanatory variables;
   generating respective feature vectors of the explanatory variable candidates and a feature vector of the objective variable, wherein each of the respective feature vectors includes elements corresponding to respective ones of the categories, wherein values of the elements indicate whether names of the explanatory variable candidates are included in the top words;
   calculating cosine similarity between each of the respective feature vectors of the explanatory variable candidates and the feature vector of the objective variable;
   ranking the explanatory variable candidates, based on the cosine similarity; and
   selecting a set of top explanatory variable candidates for the multivariate analysis, wherein the top explanatory variable candidates are most relevant to the objective variable in the multivariate analysis.

2. The computer-implemented method of claim 1, further comprising:
   creating a list of the explanatory variable candidates sorted in a descending order of the cosine similarity.

3. The computer-implemented method of claim 1, further comprising:
   determining whether explanatory variable candidates that have a same feature vector are character strings; and
   in response to determining that the explanatory variable candidates that have the same feature vector are the character strings, lowering priority of explanatory variable candidates that have less variety of values.

4. The computer-implemented method of claim 3, further comprising:
   ranking explanatory variable candidates that have the same feature vector and are the character strings, based on the priority.

5. The computer-implemented method of claim 1, wherein the values of the elements indicate whether similar words of the names of the explanatory variable candidates are included in the top words.

6. A computer program product for ranking explanatory variables in multivariate analysis, the computer program product comprising a computer readable storage medium having program instructions embodied therewith, the program instructions executable by one or more processors, the program instructions executable to:
   extract words from documents related to categories that are created for classifying a set of explanatory variables and an objective variable in the multivariate analysis;
   create a histogram of the words in each category;
   select top words in each histogram, the top words used as representing words in each category;
   select a set of explanatory variable candidates from the set of explanatory variables;
   generate respective feature vectors of the explanatory variable candidates and a feature vector of the objective variable, wherein each of the respective feature vectors includes elements corresponding to respective ones of the categories, wherein values of the elements indicate whether names of the explanatory variable candidates are included in the top words;
   calculate cosine similarity between each of the respective feature vectors of the explanatory variable candidates and the feature vector of the objective variable;
   rank the explanatory variable candidates, based on the cosine similarity; and
   select a set of top explanatory variable candidates for the multivariate analysis, wherein the top explanatory variable candidates are most relevant to the objective variable in the multivariate analysis.

7. The computer program product of claim 6, further comprising the program instructions executable to:
   create a list of the explanatory variable candidates sorted in a descending order of the cosine similarity.

8. The computer program product of claim 6, further comprising the program instructions executable to:
   determine whether explanatory variable candidates that have a same feature vector are character strings; and
   in response to determining that the explanatory variable candidates that have the same feature vector are the character strings, lower priority of explanatory variable candidates that have less variety of values.

9. The computer program product of claim 8, further comprising the program instructions executable to:
   rank explanatory variable candidates that have the same feature vector and are the character strings, based on the priority.

10. The computer program product of claim 6, wherein the values of the elements indicate whether similar words of the names of the explanatory variable candidates are included in the top words.

11. A computer system for ranking explanatory variables in multivariate analysis, the computer system comprising:
    one or more processors, one or more computer readable tangible storage devices, and program instructions stored on at least one of the one or more computer readable tangible storage devices for execution by at least one of the one or more processors, the program instructions executable to:
    extract words from documents related to categories that are created for classifying a set of explanatory variables and an objective variable in the multivariate analysis;
    create a histogram of the words in each category;
    select top words in each histogram, the top words used as representing words in each category;
    select a set of explanatory variable candidates from the set of explanatory variables;
    generate respective feature vectors of the explanatory variable candidates and a feature vector of the objective variable, wherein each of the respective feature vectors includes elements corresponding to respective ones of the categories, wherein values of the elements indicate whether names of the explanatory variable candidates are included in the top words;
    calculate cosine similarity between each of the respective feature vectors of the explanatory variable candidates and the feature vector of the objective variable;
    rank the explanatory variable candidates, based on the cosine similarity; and
    select a set of top explanatory variable candidates for the multivariate analysis, wherein the top explanatory variable candidates are most relevant to the objective variable in the multivariate analysis.

12. The computer system of claim 11, further comprising the program instructions executable to:
- create a list of the explanatory variable candidates sorted in a descending order of the cosine similarity.

13. The computer system of claim 11, further comprising the program instructions executable to:
- determine whether explanatory variable candidates that have a same feature vector are character strings;
- in response to determining that the explanatory variable candidates that have the same feature vector are the character strings, lower priority of explanatory variable candidates that have less variety of values; and
- rank explanatory variable candidates that have the same feature vector and are the character strings, based on the priority.

14. The computer system of claim 11, wherein the values of the elements indicate whether similar words of the names of the explanatory variable candidates are included in the top words.

* * * * *